United States Patent
Tanaka et al.

(10) Patent No.: US 7,070,284 B2
(45) Date of Patent: Jul. 4, 2006

(54) PROJECTOR APPARATUS

(75) Inventors: Nobutomo Tanaka, Sagamihara (JP); Eiichi Kamino, Hiratsuka (JP)

(73) Assignee: Marantz Japan, Inc., Kanagawa (JP)

( * ) Notice: Subject to any disclaimer, the term of this patent is extended or adjusted under 35 U.S.C. 154(b) by 150 days.

(21) Appl. No.: 10/802,360

(22) Filed: Mar. 17, 2004

(65) Prior Publication Data

US 2004/0257535 A1    Dec. 23, 2004

(30) Foreign Application Priority Data

Jun. 19, 2003  (JP)  ............................. 2003-174613
Jun. 30, 2003  (JP)  ............................. 2003-188093

(51) Int. Cl.
| | |
|---|---|
| G03B 21/14 | (2006.01) |
| G03B 21/28 | (2006.01) |
| G03B 3/00 | (2006.01) |
| H04N 9/12 | (2006.01) |
| H04N 9/73 | (2006.01) |
| H04N 5/74 | (2006.01) |
| G02F 1/00 | (2006.01) |

(52) U.S. Cl. ............................. 353/84; 353/88; 353/97; 353/101; 353/31; 353/37; 348/655; 348/743; 348/771; 349/7; 349/106

(58) Field of Classification Search .................. 353/82, 353/84, 88, 89, 91, 92, 97, 100, 101, 31, 353/34, 37; 348/655, 739, 742, 743, 744, 348/750, 751, 755–761, 764, 766, 770, 771, 348/789; 349/7, 8, 106; 359/618
See application file for complete search history.

(56) References Cited

U.S. PATENT DOCUMENTS

| | | | |
|---|---|---|---|
| 5,315,378 A | 5/1994 | Satou et al. | 348/655 |
| 5,428,408 A | 6/1995 | Stanton | 348/742 |
| 5,917,558 A * | 6/1999 | Stanton | 348/743 |
| 6,243,197 B1 | 6/2001 | Schalz | 359/388 |
| 6,710,920 B1 * | 3/2004 | Mashitani et al. | 359/463 |
| 6,824,276 B1 * | 11/2004 | Kimura | 353/84 |
| 2002/0154277 A1 * | 10/2002 | Mukawa et al. | 353/31 |
| 2004/0196442 A1 * | 10/2004 | D'Alessio et al. | 353/85 |

FOREIGN PATENT DOCUMENTS

JP    2001-188196    7/2001

\* cited by examiner

*Primary Examiner*—W. B. Perkey
*Assistant Examiner*—Rochelle Blackman
(74) *Attorney, Agent, or Firm*—Jordan and Hamburg LLP

(57) ABSTRACT

A projector apparatus includes digital micromirror device (DMD) Color temperature and adjustment of white balance with respect to projection light can be detected in a light condition in a convenient manner. A position of the picture formed by the projection light on the screen can be shifted. A projector apparatus includes a shutter disposed downstream of the projection optics for blocking the projection light and a sensor attached to the shutter. In a second embodiment, a projector apparatus includes a sliding structure for causing a projection optics to be slid relative to a casing constituting an apparatus body in a perpendicular relation to the optical axis of projection optics means and a follow-up structure for causing a sensor to follow the projection optics means.

10 Claims, 5 Drawing Sheets

PROJECTOR APPARATUS

BACKGROUND OF THE INVENTION

1. Field of the Invention

The present invention relates to a projector apparatus for projecting a projection light obtained by passing a white light from a light source through a color splitting device or a color wheel means, Digital Micromirror Device™ (hereinafter referred to as "DMD™") and an optical means for projection onto a screen to form thereon a desired picture, that is to say, a projector apparatus of the so-called Digital Light Processing™ type (hereinafter referred to as "DLP™ type").

More particularly, the present invention relates to a projector apparatus in which color adjustments of the projection light such as an adjustment of the color temperature and an adjustment of the white balance can be achieved more easily and accurately.

2. Prior Art

It is very important for a projector apparatus of the DLP type to have the desired color temperature and white balance which represent the quality of the projection light. When such a projector apparatus of the DLP type is used, it is therefore necessary to sense and adjust the color temperature and the white balance of the projection light to thereby achieve the desired color temperature and white balance. It has been known, for example, from Japanese Patent Application Laid-Open No. 2001-188196 (page 1 and FIG. 1, in particular) a projector apparatus of the DLP type which is arranged to be able to sense (or detect) the color temperature and white balance of the light for projection and to adjust them based on the sensing results when necessary.

In such a DLP-type projector apparatus, a great deal of heat is generated from the light source when the apparatus is in use. The generated heat may bring about a change in temperature in the body of the apparatus, leading to deformation of the apparatus body. In such a DLP-type projector apparatus, in addition, the optical systems are subjected to a secular change in their transmittance, reflectance and the like as the apparatus is used over time.

Thus, the DLP-type projector apparatus has a problem that the color temperature and the white balance, which represent the quality of the projection light in terms of perceived colors of image, may change whereby the predefined colors are not maintained, with the result that images cannot be obtained with the colors originally intended.

To solve such a problem, the color temperature and white balance of the projection light may be sensed and adjusted to the predetermined values when necessary. The DLP-type projector apparatus disclosed in the above-described reference has such a structure that those of the reflection lights from the DMD which are reflected in a direction different from the direction of projection (OFF lights) are sensed to obtain information about the projection light, based on which the color temperature and white balance are adjusted.

In a DLP-type projector apparatus, when sensing the color temperature and white balance of the projection light to adjust them to the predefined values as occasion demands, it will be most appropriate and accurate to perform such sensing on the screen onto which the light is projected to form an image. In actuality, however, the screen on which an image is formed by the projected light and the projector apparatus are a large distance apart from each other, which causes another problem that it is necessary to provide a means of a considerable scale for feeding the sensing results back to projector apparatus. Also, the sensing of the color temperature and/or white balance of the projection light in the DLP-type projector apparatus should be done exclusively for the projection light and thus need be performed in a condition where no other lights exist, which makes the work necessary for sensing the color temperature and/or white balance on the screen and for adjusting them very complicated and troublesome and thus renders the problem more serious.

When detecting the color temperature and/or white balance of the projection light of the projector apparatus, the detection of the color temperature and/or white balance must be carried out in a dark condition since accurate color temperature and/or white balance cannot be detected if any light other than the projection light is present. Hence, the detection of the color temperature of the projection light and the adjustment of the color temperature based on the detection results are carried out in a dark condition, which makes the work necessary therefor very complicated and troublesome and thus renders the problem more serious.

The projector apparatus disclosed in the above-described reference has such a structure that those of the light beams from the DMD which are reflected in a direction different from the direction of projection are detected to obtain information about the light. This structure makes it possible to carry out the detection of the color temperature and/or white balance of the light within the apparatus body and can thus circumvent the problem that the means necessary for adjusting the color temperature and/or while balance of the projection light becomes large in scale as well as the problem that the work itself for carrying out the detection of the color temperature and/or white balance is troublesome.

With the projector apparatus of the above-described structure, however, the sensing of the color temperature and white balance is performed using a light (OFF light) different from the projection light, i.e., a light obtained without passing through the optical means for projection (i.e., projection optics) which is liable to affect the color temperature and white balance of the projection light due to its change in temperature and/or secular change. Therefore, the projector apparatus of this structure has a problem that accurate sensing and secure adjustment of the color temperature and/or white balance cannot be achieved.

In recent years, viewers of projector apparatuses are becoming more and more sensitive to colors, tonality, hue and the like of the projected picture. If a picture whose color temperature and white balance are not accurately maintained is recognized as a picture whose color temperature and white balance are properly maintained, the value of the picture work itself projected by that projector apparatus will be harmed, which will render the problem more serious.

The modern projector apparatus is required to have various features which may include such a feature that the position of image projected on the screen can be shifted. A projector apparatus which can cause the position of image on the screen to be shifted may be constructed such tat the projection optics is slidable relative to the apparatus body in a perpendicular relation to its optical axis. It is necessary for a projector apparatus of the above-described structure to have such an arrangement that the color temperature and/or the white balance can be detected even when the projection optics is slid relative to the apparatus body in a perpendicular relation to its optical axis. More specifically, it is necessary for the projector apparatus to be able to detect the color temperature and/or white balance of the projection light from the projection optics even when the projection light from the projection optics moves relative to the apparatus body in a perpendicular relation to the optical axis of the projection optics.

SUMMARY OF THE INVENTION

The present invention has been made in view of the above situations and has an object to provide a projector apparatus in which detection and adjustment of the color temperature and/or white balance of the projection light can be performed in a simple and convenient manner without the need for any large-scale means; in which such detection and adjustment can be performed accurately and properly; in which the detection and adjustment of the color temperature and/or white balance of the projection light can be performed even when the projection optics is slidable relative to the apparatus body in a perpendicular relation to the optical axis of the projection optics; and in which the detection and adjustment of the color temperature and/or white balance which the projection light actually has at that instant can be performed irrespective of the change in temperature of the apparatus body and the secular change of the components thereof.

The present invention according to a first aspect is a projector apparatus which comprises a shutter disposed downstream of the projection optics means for blocking the projection light passed through the projection optics means and a sensor means attached to the shutter for detecting a color temperature and/or a white balance of the projection light, wherein a control is carried out such that the color temperature is adjusted to a desired value.

The present invention according to a second aspect is a projector apparatus which is constructed such that the projection optics means is slidable relative to the apparatus body in a perpendicular relation to an optical axis of the projection optics means and that, when the projection optics means is slid relative to the apparatus body, the sensor means for detecting the color temperature and/or white balance of the projection light is also slid so as to follow the sliding projection optics means.

More specifically, the present invention according to the first aspect is a projector apparatus which comprises a light source means for outputting a white light; a color wheel means for receiving the white light from the light source means to output a plurality of primary-color lights; a digital micromirror device means for receiving the primary-color lights and for reflecting lights for forming a picture; a projection optics means for passing the lights from the digital micromirror device means to obtain the picture enlarged to a desired size; a shutter disposed downstream of the projection optics means for blocking the light for projection passed through the projection optics means; a sensor means, attached to that surface of the shutter which blocks the light for projection, for detecting a color temperature of the light for projection; and a control means for controlling the color wheel means and the digital micromirror device means such that the lights from the digital micromirror device means form a predetermined picture in accordance with data for the picture and for performing, based on detection result from the sensor means, such a control that a color temperature of the light for projection is adjusted to a desired value.

In the projector apparatus according to the invention, a specific example of the shutter may be a shutter supported by a casing constituting the apparatus body for blocking or passing the projection light when so desired. More specifically, the above-described shutter may be a detachable cap for protecting the last-stage lens constituting a part of the projection optics means.

In the projector apparatus according to the invention, the control means may be constructed such that the output level of the light from the DMD is changed from 100% to a level substantially equal to 0% and the adjustment of color temperature is carried out at each output level. The control means may comprise, in relation to the change of output level of the light from the DMD from 100% to the level substantially equal to 0%, a memory means for storing reference values corresponding to the respective output levels.

In the projector apparatus of the above-described structure, the sensor means attached to that surface of the shutter which blocks the projection light detects the color temperature of the projection light. Thus, the detection of color temperature of the projection light is carried out within the apparatus body and, in addition, the sensor means senses the projection light after passing through the projection optics since it is disposed downstream of the projection optics.

The present invention according to the second aspect is a projector apparatus comprising an apparatus body; a light source means provided within the apparatus body for outputting a white light; a color splitting device for receiving the white light from the light source means to split the white light into a plurality of primary-color lights or a color wheel means for receiving the white light from the light source means to split the white light into a plurality of primary-color lights; digital micromirror device means each for receiving a respective one of the plurality of primary-color lights from the color splitting device or the color wheel means to reflect lights for forming a picture; a projection optics means for passing the lights from the digital micromirror device means to obtain a picture enlarged to a desired size; a shutter disposed downstream of the projection optics means for blocking the light for projection passed through the projection optics means; a sensor means, attached to that surface of the shutter which blocks the light for projection, for detecting a color temperature of the light for projection; a control means for controlling the digital micromirror device means such that the lights from the digital micromirror device means form a predetermined picture in accordance with data for the picture and for performing, based on detection result from the sensor means, such a control that a white balance of the light for projection is adjusted to a desired value; a sliding means for sliding the projection optics means relative to the apparatus body in a perpendicular relation to an optical axis of the projection optics means; and a follow-up means for sliding the sensor means, when the projection optics means is slid by the sliding means relative to the apparatus body, in such a manner that the sensor means follows the projection optics means to thereby enable the sensor means to detect the color temperature of the light for projection from the sliding projection optics means.

In the projection apparatus according to the invention, the follow-up means may comprise a supporting member for supporting the projection optics means, wherein the shutter is provided in the same system of motion as the supporting member.

In the projection apparatus of the above-described structure, when the projection optics means is slid by the sliding means relative to the apparatus body in a perpendicular relation to the optical axis of the projection optics means, the shutter supporting the sensor means for detecting the color temperature of the projection light from the projection optics means is also slid by the follow-up means so as to follow the sliding projection optics means.

In the projector apparatus according to the invention, the control means may be constructed such that when the output level of the light from the digital micromirror device means is changed from 100% to 0%, the adjustment of the white balance is carried out at each output level. The control means may comprise, in relation to the change of output level of the light from the digital micromirror device means from 100% to 0%, a memory means for storing reference values corresponding to the respective output levels.

DESCRIPTION OF THE PREFERRED
EMBODIMENTS OF THE INVENTION

Hereunder, the present invention according to a first aspect will be described with reference to the embodiment shown in the figures. It should however be noted that the present invention is not restricted to this embodiment.

Figure 1:
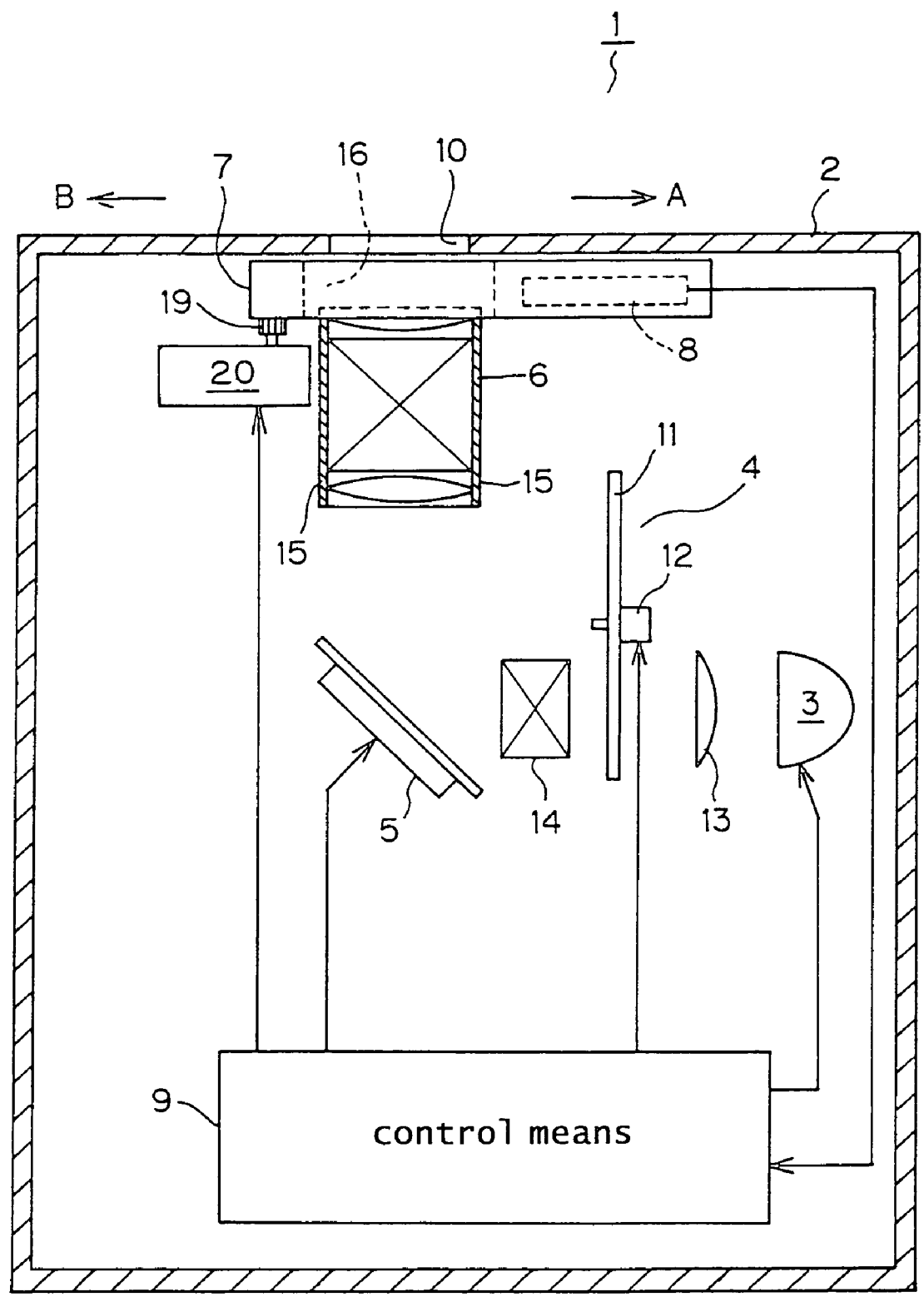
FIG. 1 is an illustration showing the structure of a first embodiment of the present invention.

As shown in FIG. 1, a projector apparatus 1 according to this invention comprises a casing 2, a light source means 3, a color wheel means 4, a DMD section 5, a projection optics 6, a shutter 7, a sensor means 8 and a control means 9.

The casing 2 is formed in its front wall with an opening 10 for passing the projection light from the projection optics 6. The light source means 3 is provided for supplying a white light and is controlled by the control means 9 such that the supply of the white light is switched on or off.

The color wheel means 4 is arranged to receive the light from the light source 3 and to output a plurality of primary-color lights. The color wheel means 4 is constituted mainly by a disc-like color filter 11 divided circumferentially into red (R), green (G) and blue (B) color sectors and an electric motor 12 for rotationally driving the color filter 11 at a predetermined angular velocity.

The rotational output of the motor 12 is controlled by the control means 9 so that the light for projection is passed through the color filter in accordance with the video signal data of the picture to be projected. A condenser lens 13 is interposed between the light source means 3 and the color wheel means 4 to converge the white light from the light source means 3 so that the light is supplied to the color filter 11 at a predetermined size.

The DMD section 5 comprises a digital micromirror device (not shown) and is arranged to receive the primary-color lights fed from the color wheel means 4 and reflect lights which form the picture to be projected. The DMD section 5 is controlled by the control means 9 in such a manner that the projection lights are reflected and outputted in accordance with the video signal data of the picture to be projected. Interposed between the color wheel means 4 and the DMD section 5 is an optical means for supplying the R, G and B primary-color lights from the color wheel means 4 to the DMD section 5 in a collimated form.

The projection optics 6 is provided for causing the projection lights from the DMD section 5 to pass therethrough and diverge to thereby obtain a picture of a desired enlarged size on the screen. More specifically, the projection optics 6 is constituted mainly by a group of lenses (not shown) and a tubular member 15 for supporting the group of lenses in predetermined conditions.

Figure 2:
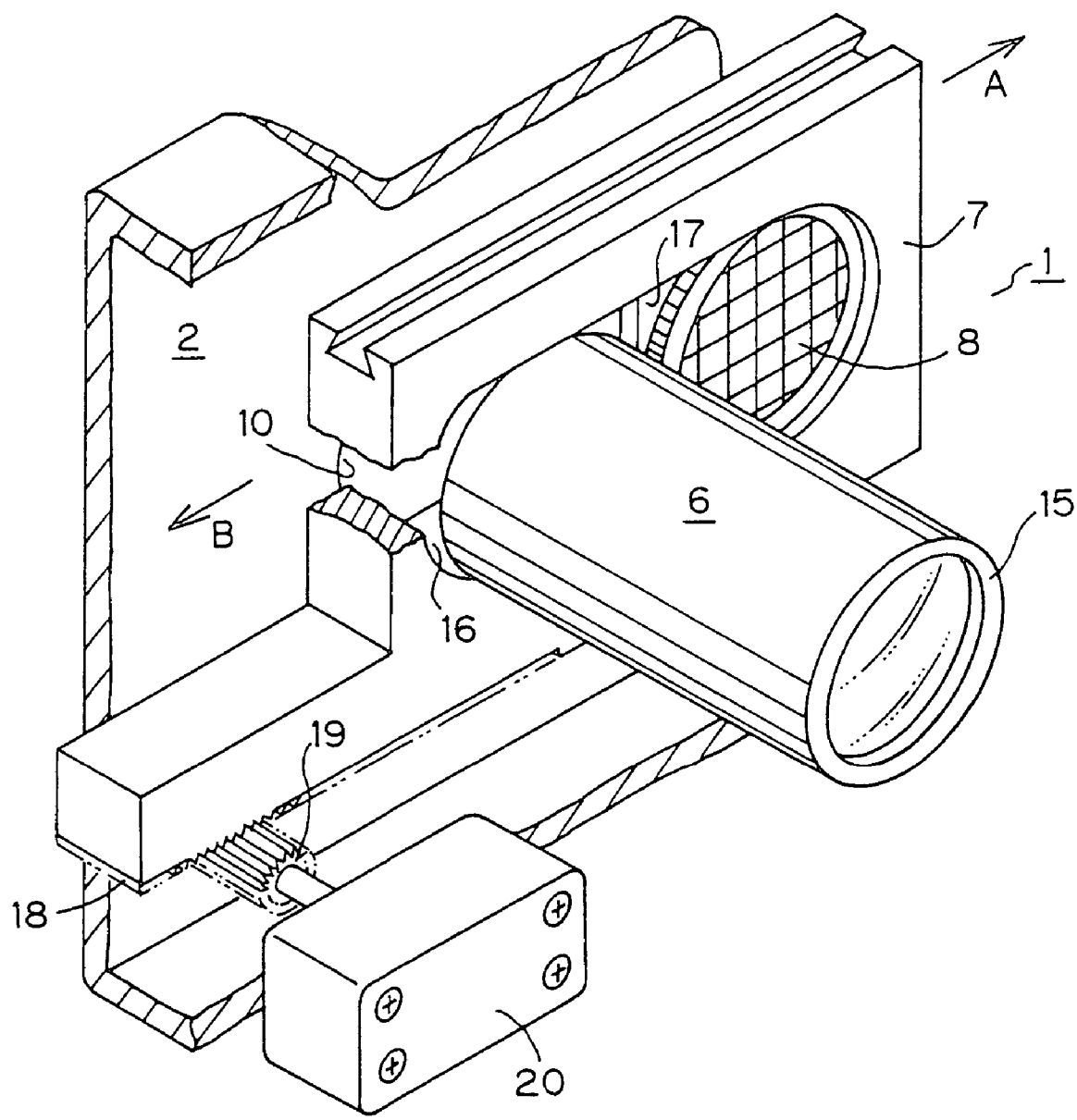
FIG. 2 is a perspective view of a principal part of the embodiment of FIG. 2.

According to the projector apparatus 1, as shown in FIGS. 1 and 2, the shutter 7 capable of blocking the projection light arriving after passing through the projection optics 6 is arranged within the front portion of the casing 2 and slidably relative to the casing 2. The shutter 7 is formed with a window part 16 for causing the projection light from the projection optics 6 to pass therethrough and a light-blocking part 17 for blocking the projection light.

The shutter 7 is further formed in its bottom surface with a rack gear 18, while a pinion gear 19 is provided so as to mesh with the rack gear 18. Thus, the shutter 7 is constructed so as to be slidable relative to the projection optics 6 in the directions indicated by arrows A and B. Further provided at 20 is a geared motor for rotationally driving the pinion gear 19.

When the geared motor 20 is driven so as to output forward rotational motion to thereby slide the shutter 7 in the direction indicated by the arrow A, the window part 16 is brought into the position aligned with the projection optics 6. In this situation, the window part 16 of the shutter 7 is in an opposed relation to the opening 10 of the casing 2, so that the projection light from the projection optics 6 can pass through the window part 16 and further travel in the direction of the screen (not shown). Conversely, when the geared motor 20 is driven so as to output reverse rotation to thereby slide the shutter 7 in the direction indicated by the arrow B, the light-blocking part 17 is brought into the position aligned with the projection optics 6, as a result of which the projection light from the projection optics 6 is blocked.

The shutter 7 is provided on its light-blocking part 17 with the sensor means 8 for detecting the color temperature of the projection light from the projection optics 6. The sensor means 8 is connected to the control means 9 and carries out a detection operation for the adjustment of color temperature so that the color wheel means 4 and the DMD section 5 are controlled in such a manner that the projection light obtained from the DMD 5 through the projection optics 6 constitutes a predetermined picture in accordance with the data stored in the control means 9.

Figure 3:
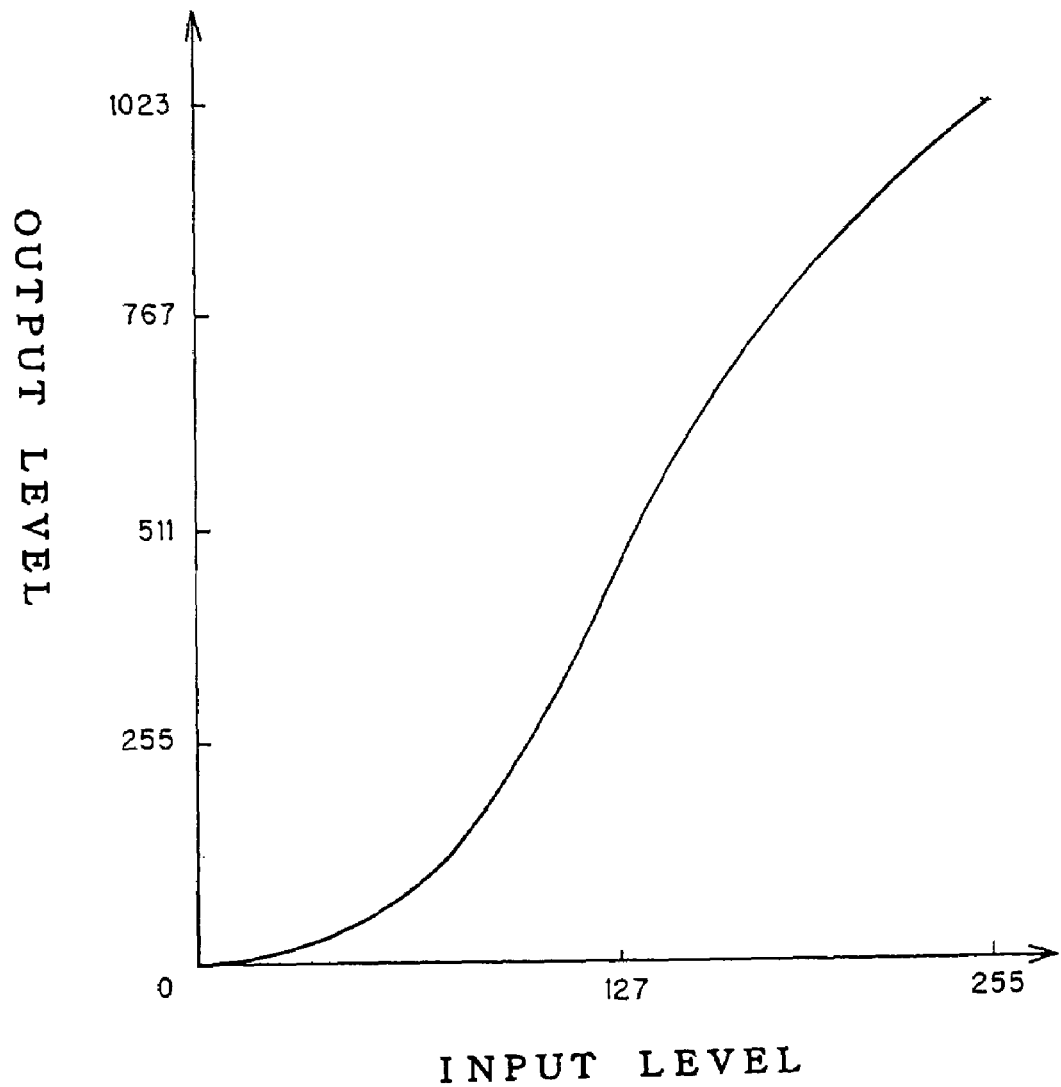
FIG. 3 is a graph showing, in the form of a characteristic line, the relation between input and output in terms of the color temperature in the embodiments of FIGS. 1 and 4.

The adjustment of color temperature just mentioned above, that is to say, the control effected by the control means 9 in such a manner that the color temperature of the projection light is adjusted to the predetermined value in accordance with the detection results from the sensor means 8 when the color temperature does not agree with the predetermined value, is carried out as follows. As shown in FIG. 3, for example, the operations of the color wheel means 4 and the DMD section 5 are controlled so as to follow such a characteristic curve (γ curve) that when the input level changes from 255 to a value close to zero in 256 gradations, the output level changes unconditionally and correspondingly from 1023 to a value close to zero in 1024 gradations. The data shown in FIG. 3 as the basis of the above control of color temperature has been stored in an internal memory (not shown) of the control means 9.

Hereunder, the adjustment of color temperature performed in the projector apparatus 1 constructed as described above will now be described.

The operator first renders the main switch of the projector apparatus 1 ON to cause it to start operation and then operates the remote control means (not shown) so that the geared motor 20 is driven via the control means 9 to output reverse rotation, whereby the shutter 7 is slid in the direction indicated by the arrow B. As a result, the light-blocking part 17 comes to the position opposite to the projection optics 6, where the projection light is blocked and the last-stage lens of the projection optics 6 is covered by the sensor means 8.

Next, the operator causes the light source means 3 through the remote control means and the control means 9 to output white light. This white light from the light source means 3 is converged by the condenser lens 13 so as to have a predetermined size and is thence outputted through the color wheel means 4 to the optical means 14 as the primary-color lights. The primary-color lights are collimated by the optical means 14 and supplied to the DMD section 5, at which the primary-color lights are reflected towards the projection optics 6 as a white light to be tested which corresponds to the input level of 100% and is in accordance with the video signal data. The light from the DMD section 5 travels through the projection optics 6 to the shutter 7 as the projection light which is then blocked by the shutter 7 but reaches the sensor means 8.

The sensor means 8 detects the color temperature of the projection light and sends the detected data to the control means 9. The control means 9 determines whether the data from the sensor means 8 agrees with the value corresponding to the 100% input level as stored in the internal memory in terms of the relation between the input level and the output level. If they agree, the control means 9 determines that there is no problem and instructs to proceed to the next step. More specifically, the sensor means 8 detects at which ratio (color temperature) the white light corresponding to the 100% input level is constituted by R, G and B, while the control means 9 determines whether it is constituted by R, G and B at the predetermined ratio (color temperature) based on the detected result and the ration as stored in the internal memory. If it is determined that the white light is constituted at the predetermined ratio, then there will be no problem and an instruction is issued to proceed to the detection at the next stage.

On the other hand, when it is determined that the white light corresponding to the input level of 100% is not constituted by R, G and B at the predetermined ratio (color temperature), the control means 9 sends to the DMD section 5 a signal for adjusting the color temperature so that the same ratio as that stored in the internal memory is obtained. When the color temperature corresponding to the output level of 100% has thus been obtained, the relation between the input level and the output level is detected for the case where the output level is 5% lower, i.e., for the output level of 95%, and the color temperature is adjusted by acting upon the DMD section 5 as occasion demands.

In a similar manner, as the input level is decreased each time by 5% until the input level is decreased to a level close to 0%, the detection and the necessary adjustment of the color temperature are carried out so that the relation between the input level and the output level follows the characteristic shown in FIG. 3. Since it is impossible to measure the color temperature at the input level of 0%, a value at an input level which can be deemed as substantially equal to 0% (at the input level of 0.5%, for example) is used.

As described above, the projector apparatus 1 detects the color temperature each time directly from the projection light passed through the projection optics 6, so that it is possible to obtain more accurate detection results and to carry out more appropriate color-temperature adjustments for the projection light as compared to the case where the color temperature is detected from a light other than the light for projection.

As described above, the projector apparatus 1 is constructed such that the detection of color temperature can be performed by the sensor means 8 attached to the shutter 7 and the control means 9, so that it is possible to detect and adjust the color temperature conveniently and in a reduced scale as compared to the case where the detection of color temperature is done on the screen surface.

According to the conventional apparatus, since there should exist no other lights than the projection light to be detected when detecting the projection light, the work for the detection of color temperature must be done in a very dark environment and is therefore often inefficient. According to the projector apparatus 1, however, when detecting the color temperature the sensor means 8 senses the projection light only, so that the color temperature can be detected independently from the surrounding brightness and thus efficient work for the detection and adjustment of the color temperature is assured.

The projector apparatus 1 is constructed such that the sensor means 8 for detecting the color temperature is attached to the shutter 7 and that the projection light from the projection optics 6 is blocked when the shutter 7 is slid relative to the casing. In the case of a projector apparatus of the type for which the operator can easily access the last-stage lens of the projection optics 6, the shutter 7 may take the form of a cap-like member which is detachable by a hand of the operator and has the sensor means 8 attached to its inner surface.

The adjustment of the color temperature of the above-described projector apparatus 1 is carried out in such a manner that it is first determined at which ratio (color temperature) the white light corresponding to the 100% input level is constituted by R, G and B, based on which the color temperature is adjusted if necessary, then the relation between the input level and the output level is determined with respect to the output level of 95% which is 5% lower than the previous level, and thereafter the input level is decreased by 5% each time in a similar manner. However, the step by which the input level is decreased each time may be selected to be any suitable value such as 3% in accordance with the accuracy of detection, the time required for the adjustment of the color temperature and so on.

Although the curve representing the relation between the input level and the output level shown in FIG. 3 is continuous, the relation is represented by discrete values when actual ratios (color temperatures) between R, G and B are detected. The curve has been drawn in this manner expecting a case where the ration (color temperature) between R, G and B changes continuously, and indicates that it has no singular point.

In the projector apparatus 1, the checking and adjustment of color temperature are performed in accordance with the characteristic curve ($\gamma$ curve) shown in FIG. 3. It may however be preferable that the characteristic curve is selected from different ones when desired and that the characteristic curve stored in the control means 9 can be rewritten as occasion demands.

Although the projector apparatus 1 is constructed so as to function in response to operations of the remote control means by the operator, the apparatus may be constructed such that it has a control panel provided on the top or side wall of the casing to allow the operator to directly control the apparatus, or constructed such that the remote control and the direct control can be used in combination.

The projector apparatus 1 is constructed such that the video signal representing the content to be projected is generated internally of the apparatus. However, the projector apparatus may be constructed such that the video signal is supplied from the outside through a signal cable or the like.

Hereunder, the present invention according to a second aspect will be described with reference to an embodiment shown in FIGS. 4 and 5. It should, however, be noted that the present invention is not restricted to this embodiment.

Figure 4:
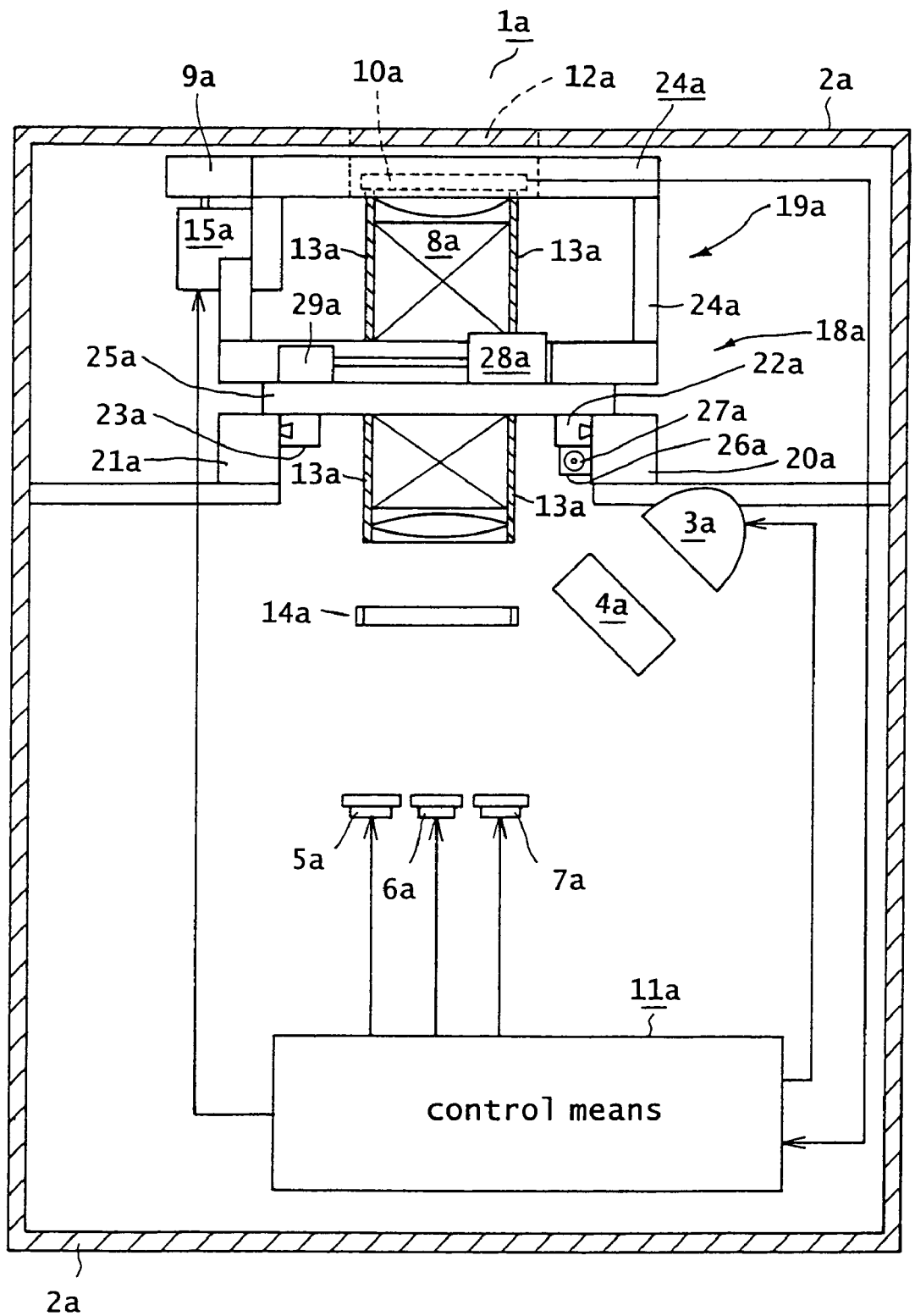
FIG. 4 is an illustration showing the structure of a second embodiment of the present invention.
Figure 5:
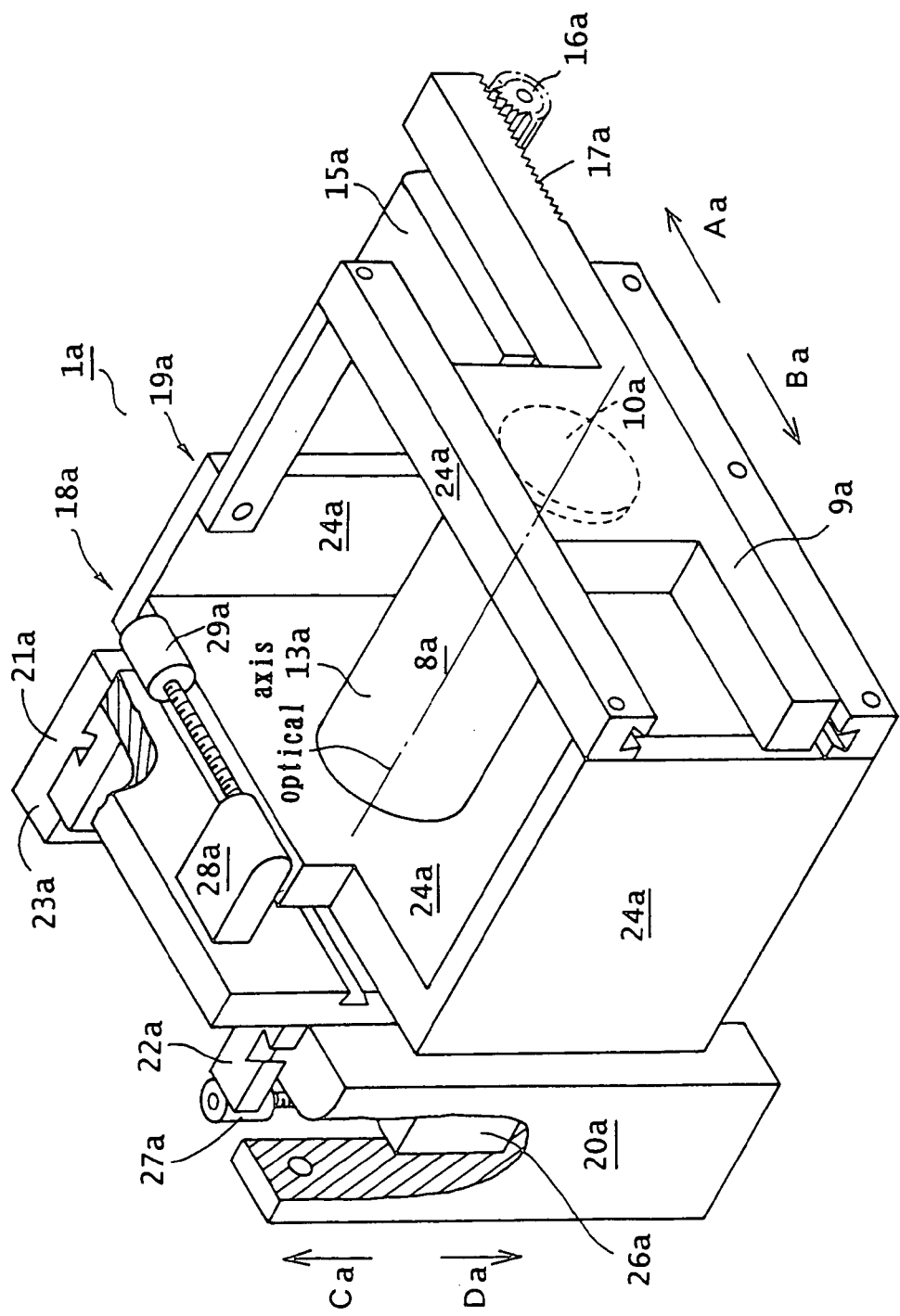
FIG. 5 is a perspective view of a principal part of the second embodiment of FIG. 4.

As shown in FIG. 4, a projector apparatus 1a is provided with a casing 2a, a light source means 3a, a color splitting device 4a, digital micromirror device (DMD) means 5a, 6a and 7a, a projection optics 8a, a shutter 9a, a sensor means 10a and a control means 11a.

The casing 2a constitutes a main part of the apparatus body and is formed in its front wall with an opening 12a for passing the projection light from the projection optics 8a towards a screen (not shown). The light source means 3a is provided for supplying a white light and is controlled by the control means 11a such that the supply of the white light is switched ON or OFF.

The color splitting device 4a is provided for receiving the white light from the light source means 3a and for splitting it into a plurality of primary-color lights, i.e., three R, G and B lights, to be outputted.

The DMD means 5a, 6a and 7a are each arranged to receive a respective one of the R, G and B primary-color lights fed from the color splitting device 4a and send the reflected lights to the projection optics 8a so that a predetermined picture is formed. The DMD means 5a, 6a and 7a are controlled by the control means 11a so that light beams for the projection are reflected and outputted in accordance with the video signal data for the picture.

The projection optics 8a is provided for causing the projection lights from the DMD means 5a, 6a and 7a to pass therethrough and diverge to thereby obtain a picture of a desired enlarged size on the screen. More specifically, the projection optics 8a is constituted mainly by a group of lenses (not shown) and a tubular member 13a for supporting the group of lenses in predetermined conditions. A condenser 14a is interposed between the DMD means 5a, 6a and 7a and the projection optics 8a.

The shutter 9a is disposed downstream of the projection optics 8a and can block the projection light arriving after passing through the projection optics 8a. The shutter 9a is constructed, as shown in FIG. 5, so as to be slidable in the right and left directions (the directions indicated by arrows Aa and Ba) to thereby allow to pass or block the projection light from the projection optics 8a, respectively.

The shutter 9a is constituted mainly by a geared motor 15a fixedly mounted on a member whose motion is the same as the projection optics 8a, a pinion gear 16 driven by the geared motor 15a, and a rack gear 17a formed in the bottom portion of the shutter 9a.

The sensor means 10a is attached to that surface of the shutter 9a which blocks the projection light and detects the color temperature of the projection light from the projection optics 8a. More specifically, the sensor means 10a is connected to the control means 11a and carries out a detection operation for the adjustment of color temperature so that the DMD means 5a, 6a and 7a are controlled in such a manner that the projection light obtained from the DMD means 5a, 6a and 7a through the projection optics 8a constitutes a predetermined picture in accordance with the data stored in the control means 11a.

The control means 11a controls the operation of the DMD means 5a, 6a and 7a such that the projection light forms a predetermined picture on the screen in accordance with the video signal data and also controls the detection and adjustment in accordance with the detection results in such a manner that the white balance of the projection light is established as desired.

The projector apparatus 1a is further provided with a sliding means 18a for sliding the projection optics 8a relative to the casing 2a constituting the apparatus body in a perpendicular relation to the optical axis of the projection optics 8a, and a follow-up means 19a for sliding the sensor means 10a to follow the projection optics 8a so that the sensor means 10a can detect the color temperature of the projection light from the sliding projection optics 8a when the projection optics 8a is slid relative to the casing 2a by the sliding means 18a.

The sliding means 18a is constructed to be able to cause sliding members 22a and 23a to be slidably moved in the upward and downward directions (the directions indicated by arrows Ca and Da) relative to a pair of supporting members 20a and 21a integrally formed with the casing 2a, and to cause a mounting member 24a for mounting the projection optics 8 thereon to be slidably moved in the right and left directions (the directions indicated by arrows Aa and Ba) relative to the sliding members 22a and 23a.

More specifically, the sliding means 18a is constituted mainly by the pair of supporting members 20a and 21a which are integral with the casing 2a; the sliding members 22a and 23a which are slidable in the upward and downward directions relative to the supporting members 20a and 21a; a sliding plate 25a integral with the sliding members 22a and 23a; a step-type geared motor 26a and a feeding screw means 27a which constitute a drive means disposed between the supporting member 20a and the sliding member 22a for causing the sliding member 22a to be slid in the directions indicated by arrows Ca and Da relative to the supporting member 20a; the mounting member 24a slidable in the directions indicated by arrows Aa and Ba relative to the sliding plate 25a; and a geared motor 28a and a feeding screw means 29a which constitute a drive means disposed between the sliding plate 25a and the mounting member 24a for causing the mounting member 24a to be slid in the directions indicated by arrows Aa and Ba relative to the sliding plate 25a.

The follow-up means 19a is constituted mainly by the mounting member 24a for mounting the projection optics 8a thereon and the shutter 9a slidably supported by the mounting member 24a.

The adjustment of color temperatures mentioned above, that is to say, the control effected by the control means 11a in such a manner that the white balance of the projection light is adjusted as desired in accordance with the detection results from the sensor means 10a is carried out as follows. As shown in FIG. 3, for example, the operations of the color splitting device 4a and the DMD means 5a, 6a and 7a are controlled so as to follow such a characteristic curve ($\gamma$ curve) that when the input level changes from zero to 255 in 256 gradations, the output level changes unconditionally and correspondingly from zero to 1023 in 1024 gradations. The data shown in FIG. 3 as the basis of the above control of color temperature has been stored in an internal memory (not shown) of the control means 11a.

Hereunder, operations for the adjustment of color temperature in the projector apparatus 1a constructed as described above will now be described.

The operator first renders the main switch of the projector apparatus 1a ON to cause it to start operation and then operates the remote control means (not shown) so that the geared motor 15a is driven via the control means 11a to output reverse rotation, whereby the shutter 9a is slid in the direction indicated by the arrow Ba. As a result, the centrally disposed light-blocking part of the shutter 9a comes to the position opposite to the projection optics 8a, where the projection light is blocked and the last-stage lens of the projection optics 8a is covered by the sensor means 10a.

Next, the operator causes the light source means 3a to output a white light through the activation of the remote control means and the control means 11a. This white light from the light source means 3a is split by the color splitting device 4a into R, G and B primary-color lights which travel toward the DMD means 5a, 6a and 7a, respectively. The R, G and B primary-color lights arriving at the DMD means 5a, 6a and 7a are reflected towards the projection optics 8a as a white light to be tested which corresponds to the input level of 100% and is in accordance with the video signal data. The R, G and B primary-color lights from the DMD means 5a, 6a and 7a travel through the projection optics 8a toward the shutter 9a as the projection light which is then blocked by the shutter 9a but reaches the sensor means 10a.

The sensor means 10a senses the projection light and sends the data to the control means 11a. The control means 11a determines whether the data from the sensor means 10a agrees with the value corresponding to the 100% input level as stored in the internal memory in terms of the relation between the input level and the output level. If they agree, the control means 11a determines that there is no problem and instructs to proceed to the next step. More specifically, the sensor means 10a detects at which ratio (color temperature) the white light corresponding to the 100% input level is constituted by R, G and B. The control means 11a determines whether it is constituted by R, G and B at the predetermined ratio (color temperature) based on the detected result and the ration as stored in the internal memory. If it is determined that the white light is constituted at the predetermined ratio, then there will be no problem and an instruction is issued to proceed to the detection of the next stage.

On the other hand, when it is determined by the control means 11a that the white light corresponding to the input level of 100% is not constituted by R, G and B at the predetermined ratio (color temperature), the control means 11a sends to the DMD means 5a, 6a and 7a signals for adjusting the color temperature so that the same ratio as that stored in the internal memory is obtained. When the color temperature corresponding to the output level of 100% has thus been obtained, the relation between the input level and the output level is detected for the case where the output level is 5% lower, i.e., for the output level of 95%, and the color temperature is adjusted by acting upon the DMD means 5a, 6a and 7a when necessary.

In a similar manner, as the input level is decreased each time by 5% until the input level is decreased to a level close to 0%, the sensing and the necessary color-temperature adjustment are performed so that the relation between the input level and the output level follows the characteristic shown in FIG. 3. Since it is impossible to measure the color temperature at the input level of 0%, a value at an input level which can be deemed as substantially equal to 0% (at the input level of 0.5%, for example) is used.

As described above, the projector apparatus 1a detects the color temperature each time directly from the projection light passed through the projection optics 8a, so that it is possible to obtain more accurate detection results and to carry out more appropriate color-temperature adjustments for the projection light as compared to the case where the color temperature is detected from a light other than the light for projection.

As described above, the projector apparatus 1a is constructed such that the sensing of color temperature and the adjustment of white balance can be performed by the control means 11a based on the detection results from the sensor means 10a attached to the shutter 9a, so that the sensing and the adjustment of white balance can be performed conveniently and in a reduced scale as compared to the case where the sensing of color temperature is done on the screen surface.

According to the conventional apparatus, since there should exist no other lights than the projection light from the projector apparatus when sensing the color temperature on the screen surface, the work for the sensing of color temperature must be done in a very dark environment and is therefore often inefficient. According to the projector apparatus 1a, however, the sensing of color temperature can be performed independently of the surrounding brightness and thus efficient work for the sensing of color temperature and the adjustment of white balance is assured.

According to the above-described adjustment of color temperature performed in the projector apparatus 1a, it is determined at which ratio (color temperature) the white light is constituted by R, G and B for the input level of 100% and the adjustment of white balance is performed when necessary. Subsequently, the relation between the input level and the output level is sensed for the case where the output level is 5% lower, i.e., 95%. Thereafter, the input level is decreased by 5% each time, and the output level is sensed at that instant. However, the step by which the input level is decreased each time may be selected to be any suitable value, such as 3% when accurate values should be obtained, in accordance with the accuracy of detection, the time required for the adjustment of color temperature and so on.

Although the characteristic curve representing the relation between the input level and the output level shown in FIG. 3 is continuous, the relation is represented by discrete values when actual ratios (color temperatures) between R, G and B are sensed. The curve has been drawn in this manner expecting a case where the ration (color temperature) between R, G and B changes continuously, and indicates that it has no singular point.

In the projector apparatus 1a, the checking and adjustment of color temperature are performed in accordance with the characteristic curve (γ curve) shown in FIG. 3. It may however be preferable that the characteristic curve is selected from different ones when desired and that the characteristic curve stored in the control means 11a can be rewritten when appropriate.

After the projector apparatus 1a has completed the above-mentioned detection of color temperature and the adjustment of white balance, the operator activates the remote control means to drive the geared motor 15a through the control means 11a in the forward direction to thereby slide the shutter 9a in the direction indicated by arrow Aa. As a result, the light-blocking part of the shutter 9a is now at a position shifted from the front of the projection optics 8a, so that the projection light from the projection optics 8a can travel towards the screen. The operator then operates the remote control means in order to select a desired video signal data and to cause the projector apparatus 1a to output it so that the desired picture is projected on the screen.

However, it may happen that the picture formed by the projection light from the projector apparatus 1a is out of the desired position on the screen. In such a case, the operator can activate the sliding means 18a to slide the projection optics 8a relative to the casing 2a so that the picture formed by the projection light from the projector apparatus 1a moves to the desired position on the screen. More specifically, when the geared motor 26a is activated to drive the feeding screw means 27a, the sliding plate 25a integrally formed with the sliding members 22a and 23a is slidably moved in a direction indicated by arrow Ca or Da relative to the supporting members 20a and 21a which are integral with the casing 2a. On the other hand, when the geared motor 28a is activated to drive the feeding screw means 29a, the mounting member 24a on which the projection optics 8a is mounted is slidably moved in a direction indicated by arrow Aa or Ba relative to the sliding plate 25a.

Thus, the projection optics 8a is slidable relative to the casing 2a in the directions indicated by arrows Aa and Ba as well as in the directions indicated by arrows Ca and Da with respect to the optical axis of the projection optics 8a. It is therefore possible to bring the picture, formed by the projection light from the projector apparatus 1a, to the desired position by sliding the projection optics by a desired amount.

In addition, the projector apparatus 1a is provided with the follow-up means 19a as described above. Therefore, when the projection optics 8a is slid relative to the casing 2a, the sensor means 10a is also slid in the same direction by the same distance since the sensor means 10a is coupled through the shutter 9a and the mounting member 24a to the same system of motion as the projection optics 8a. It is thus possible for the sensor means 10a to carry out the detection of color temperature and the adjustment of white balance even when the projection optics 8a is slid relative to the casing 2a.

The projector apparatus 1a is arranged such that the projection optics 8a and the sensor means 10a are mounted on the same motion system by means of the follow-up means 19a. Alternatively, the apparatus may be arranged such that, when the projection optics 8a is slidably moved, its direction and distance are determined and the sensor means 10a is moved in the same direction over the same distance.

Hereunder, a modified form of the projector apparatus 1a according to the second aspect of the invention will be described.

A projector apparatus according to this modified form comprises an apparatus body; a light source means provided within the apparatus body for outputting a white light; a color wheel means for receiving the white light from the light source means to split it into a plurality of primary-color lights; digital micromirror device means each for receiving a respective one of the primary-color lights and for reflecting lights constituting a picture; a projection optics means for passing the lights from the digital micromirror device means to obtain a picture enlarged to a desired size; a shutter disposed downstream of the projection optics means for blocking the light for projection passed through the projection optics means; a sensor means, attached to that surface of the shutter which blocks the light for projection, for detecting a color temperature of the light for projection; a control means for controlling the color wheel means and the digital micromirror device means such that the lights from the plural digital micromirror device means constitute a predetermined picture in accordance with data for the picture and for performing based on detection result from the sensor means such a control that a white balance of the light for projection is adjusted to a desired value; a sliding means for sliding the projection optics means relative to the apparatus body in a perpendicular relation to an optical axis of the projection optics means; and a follow-up means for sliding the sensor means, when the projection optics means is slid by the sliding means relative to the apparatus body, in such a manner that the sensor means follows the projection optics means to thereby enable the sensor means to detect the color temperature of the light for projection from the sliding projection optics means.

The apparatus body and the light source means have the same structure and function in the same way as the casing 2a of the projector apparatus 1a and the light source means 3a, respectively. The color wheel means is constituted mainly by a disc-like color filter divided circumferentially into R, G and B color sectors and an electric motor for rotationally driving the color filter at a predetermined angular velocity. The rotational output of the motor is controlled by the control means in accordance with the video signal data of the picture to be projected.

The digital micromirror device means are constructed, differently from the projection apparatus 1a, to process the three R, G and B primary-color lights independently from each other. The projection optics means, the shutter, the sensor means, the sliding means and the follow-up means are substantially the same as those of the projector apparatus 1a, respectively.

The modified form of the projector apparatus is constructed as described above. According to this modified form, it is therefore possible to carry out the detection of color temperature and the adjustment of white balance for the projection light in a convenient manner in a light condition as in the case of the projector apparatus 1a.

According to the projector apparatus in this modified form, it is possible to slidably move the projection optics means by the sliding means relative to the apparatus body (i.e., the casing) in a perpendicular relation to the optical axis of the projection optics means as in the case of the projector apparatus 1a, so that the projected picture can be moved to a desired position on the screen.

Furthermore, the projector apparatus in this modified form is constructed such that when the projection optics means is slid relative to the apparatus body (casing) in a perpendicular relation to the optical axis of the projection optics means, the follow-up means operates to cause the sensor means to be slid in the same direction and over the same distance as the projection optics means so as to follow this projection optics means.

With the projector apparatus in this modified form, therefore, if the picture formed by the projection light from the projection optics means is shifted from the desired position on the screen, the operator may cause the projection optics means to slide relative to the apparatus body to thereby move the projected picture to the desired position on the screen. In this case, the sensor means is also slid by the follow-up means in the same direction and over the same distance as the projection optics means, so that the detection of color temperature and the adjustment of white balance can be performed without any problems.

The shutter 9a in the projector apparatus 1a and the shutter in the projector apparatus in the above-described modified form are constructed so as to be slidable for blocking the projection light. The shutter may alternatively be constructed so as to be swingable about a pivotal point on the shutter or hinged to take an open and a closed position.

As described above, the projector apparatus according to the first aspect of the invention is constructed comprising the shutter for blocking the projection light from the projection optics means and the sensor means attached to that surface of the shutter which blocks the projection light for detecting the color temperature, so that it is possible to carry out the detection of color temperature and the adjustment of white balance in an easy manner with a high accuracy. Also, according to this invention, the output level of the projection light from the projection optics means is changed from 100% to a level substantially equal to 0%, while the value of color temperature of the projection light corresponding to each output level has been stored and is checked, so that it becomes possible to check and adjust the color temperature corresponding to any output level of the projection light which can vary from 100% to a level substantially equal to 0%.

The projector apparatus according to the second aspect of the invention is constructed such that the sensor means is attached to the shutter for blocking the projection light from the projection optics means, the projection optics means being constructed so as to be slidable relative to the apparatus body in a perpendicular relation to the optical axis of the projection optics means, and the sensor means being constructed so as to follow the projection optics means. It is therefore possible to carry out the detection of color temperature and the adjustment of white balance in an easy manner with a high accuracy in a light condition. It is also possible to shift the position of the picture formed by the projection light on the screen. It is further possible to carry out the detection of color temperature and the adjustment of white balance even when the position of the picture formed by the projection light is shifted on the screen since the sensor means is slid so as to follow projection optics means.

What is claimed is:

1. A projector apparatus comprising:
    a light source means for outputting a white light;
    a color wheel means for receiving the white light from said light source means to output a plurality of primary-color lights;
    a digital micromirror device means for receiving the primary-color lights and for reflecting lights for constituting a picture;
    a projection optics means for passing the light from said digital micromirror device means to obtain a picture enlarged to a desired size;
    a shutter disposed downstream of said projection optics means for blocking the light for projection passed through said projection optics means;
    a sensor means, attached to that surface of said shutter which blocks the light for projection, for detecting a color temperature of the light for projection; and
    a control means for controlling said color wheel means and said digital micromirror device means such that the light from said digital micromirror device means constitutes a predetermined picture in accordance with data for the picture and for performing, based on detection result from said sensor means, such a control that the color temperature of the light for projection is adjusted to a desired value.

2. A projector apparatus according to claim 1 or 4, wherein said shutter is supported by a casing constituting a body of said apparatus and arranged so as to block or allow to pass the light for projection.

3. A projector apparatus according to claim 1 or 4, wherein said shutter is a cap for protecting the last-stage lens of said projection optics means.

4. A projector apparatus comprising:
    a light source means for outputting a white light;
    a color wheel means for receiving the white light from said light source means to output a plurality of primary-color lights;
    a digital micromirror device means for receiving the primary-color lights and for reflecting lights for constituting a picture;
    a projection optics means for passing the light from said digital micromirror device means to obtain a picture enlarged to a desired size;
    a shutter disposed downstream of said projection optics means for blocking the light for projection passed through said projection optics means;
    a sensor means, attached to that surface of said shutter which blocks the light for projection, for detecting a color temperature of the light for projection;
    a control means for controlling said color wheel means and said digital micromirror device means such that the light from said digital micromirror device means constitutes a predetermined picture in accordance with data for the picture and for performing, based on detection result from said sensor means, such a control that the color temperature of the light for projection is adjusted to a desired value; and
    said control means being constructed to change an output level of the light for projection from said projection optics means from 100% to a level substantially equal to 0% in steps and to carry out the adjustment of color temperature at each output level.

5. A projector apparatus according to claim 4, wherein, in relation to the change of output level of the light for projection from said projection optics means from 100% to the level substantially equal to 0%, said control means comprises a memory means for storing reference values corresponding to the respective output levels.

6. A projector apparatus comprising:
    an apparatus body;
    a light source means provided within said apparatus body for outputting a white light;
    a color splitting device for receiving the white light from said light source means to split the white light into a plurality of primary-color lights; digital micromirror device means each for receiving a respective one of the plurality of primary-color lights and for reflecting light constituting a picture;
    a projection optics means for passing the light from said digital micromirror device means to obtain a picture enlarged to a desired size;
    a shutter disposed downstream of said projection optics means for blocking the light for projection passed through said projection optics means;
    a sensor means, attached to that surface of said shutter which blocks the light for projection, for detecting a color temperature of the light for projection;
    a control means for controlling said digital micromirror device means such that the light from said digital micromirror device means constitutes a predetermined picture in accordance with data for the picture and for performing, based on detection result from said sensor means, such a control that a white balance of the light for projection is adjusted to a desired value;
    a sliding means for sliding said projection optics means relative to said apparatus body in a perpendicular relation to an optical axis of said projection optics means; and a follow-up means for sliding said sensor means, when said projection optics means is slid by said sliding means relative to said apparatus body, in such a manner that said sensor means follows said projection optics means to thereby enable said sensor means to detect the color temperature of the light for projection from the sliding projection optics means.

7. A projector apparatus comprising:

an apparatus body;

a light source means provided within said apparatus body for outputting a white light;

a color wheel means for receiving the white light from said light source means to split the white light into a plurality of primary-color lights;

digital micromirror device means each for receiving a respective one of the primary-color lights and for reflecting light constituting a picture;

a projection optics means for passing the light from said digital micromirror device means to obtain a picture enlarged to a desired size;

a shutter disposed downstream of said projection optics means for blocking the light for projection passed through said projection optics means;

a sensor means, attached to that surface of said shutter which blocks the light for projection, for detecting a color temperature of the light for projection;

a control means for controlling said color wheel means and said digital micromirror device means such that the lights from the plural digital micromirror device means constitute a predetermined picture in accordance with data for the picture and for performing, based on detection result from said sensor means, such a control that a white balance of the light for projection is adjusted to a desired value;

a sliding means for sliding said projection optics means relative to said apparatus body in a perpendicular relation to an optical axis of said projection optics means; and a follow-up means for sliding said sensor means, when said projection optics means is slid by said sliding means relative to said apparatus body, in such a manner that said sensor means follows said projection optics means to thereby enable said sensor means to detect the color temperature of the light for projection from the sliding projection optics means.

8. A projector apparatus according to claim 6 or claim 7, wherein said follow-up means comprises a supporting member for supporting said projection optics means, said shutter being provided in the same system of motion as said supporting member.

9. A projector apparatus comprising:

an apparatus body;

a light source means provided within said apparatus body for outputting a white light;

a color splitting device for receiving the white light from said light source means to split the white light into a plurality of primary-color lights or a color wheel means for receiving the white light from said light source means to split the white light into a plurality of primary-color lights;

digital micromirror device means each for receiving a respective one of the plurality of primary-color lights outputted by said color splitting device or said color wheel means to reflect light for constituting a picture;

a projection optics means for passing the lights from said digital micromirror device means to obtain a picture enlarged to a desired size;

a shutter disposed downstream of said projection optics means for blocking the light for projection passed through said projection optics means;

a sensor means, attached to that surface of said shutter which blocks the light for projection, for detecting a color temperature of the light for projection;

a control means for controlling said digital micromirror device means such that the lights from said digital micromirror device means constitute a predetermined picture in accordance with data for the picture and for performing, based on detection result from said sensor means, such a control that a white balance of the light for projection is adjusted to a desired value;

a sliding means for sliding said projection optics means relative to said apparatus body in a perpendicular relation to an optical axis of said projection optics means; and a follow-up means for sliding said sensor means, when said projection optics means is slid by said sliding means relative to said apparatus body, in such a manner that said sensor means follows said projection optics means to thereby enable said sensor means to detect the color temperature of the light for projection from the sliding projection optics means.

10. A projector apparatus according to claim 9, wherein said follow-up means comprises a supporting member for supporting said projection optics means, said shutter being provided in the same system of motion as said supporting member.

* * * * *